(12) United States Patent
Ehlert

(10) Patent No.: US 11,926,373 B2
(45) Date of Patent: Mar. 12, 2024

(54) METHOD FOR OPERATING A STEERING SYSTEM HAVING A COMPENSATION DEVICE FOR REDUCING A TORQUE RIPPLE OF A THREE-PHASE MACHINE

(71) Applicant: Robert Bosch GmbH, Stuttgart (DE)

(72) Inventor: Stefan Ehlert, Goeppingen (DE)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 16/963,327

(22) PCT Filed: Dec. 17, 2018

(86) PCT No.: PCT/EP2018/085210
§ 371 (c)(1),
(2) Date: Jul. 20, 2020

(87) PCT Pub. No.: WO2019/145093
PCT Pub. Date: Aug. 1, 2019

(65) Prior Publication Data
US 2020/0361520 A1    Nov. 19, 2020

(30) Foreign Application Priority Data
Jan. 23, 2018 (DE) ...................... 10 2018 200 995.3

(51) Int. Cl.
*B62D 5/04*      (2006.01)
*H02P 21/05*      (2006.01)
*H02P 21/22*      (2016.01)

(52) U.S. Cl.
CPC .............. *B62D 5/046* (2013.01); *H02P 21/05* (2013.01); *H02P 21/22* (2016.02)

(58) Field of Classification Search
CPC ........... B62D 5/04; B62D 5/046; H02P 21/05; H02P 21/22
(Continued)

(56) References Cited

U.S. PATENT DOCUMENTS 6,122,579 A    9/2000   Collier-Hallman et al.
6,392,418 B1 *   5/2002   Mir ........................ B62D 5/046
                                                     388/903
(Continued)

FOREIGN PATENT DOCUMENTS

BR    112018076801 B1 *   3/2023 ............. B62D 5/046
BR    112018076846 B1 *   3/2023 ............. B62D 5/046
(Continued)

OTHER PUBLICATIONS

International Search Report corresponding to PCT Application No. PCT/EP2018/085210, dated Mar. 27, 2019 (German and English language document) (6 pages).

*Primary Examiner* — Atul Trivedi
(74) *Attorney, Agent, or Firm* — Maginot, Moore & Beck LLP

(57) ABSTRACT

The disclosure relates to a method for operating a steering system, wherein the steering system has at least one electrical three-phase machine, at least one control circuit for actuating the electrical three-phase machine and at least one compensation device, which is operatively connected to the control circuit, for reducing a torque ripple of the electrical three-phase machine, wherein at least one compensation parameter of the compensation device is determined. It is proposed that during the determination of the at least one compensation parameter, at least one operating variable correlated with a pre-commutation angle of the electrical three-phase machine and/or with a supply voltage of the electrical three-phase machine is taken into consideration.

12 Claims, 2 Drawing Sheets

(58) Field of Classification Search
USPC .......................................................... 701/37
See application file for complete search history.

(56) References Cited

U.S. PATENT DOCUMENTS

| | | | | |
|---|---|---|---|---|
| 6,914,399 | B2 * | 7/2005 | Kushion | H02P 6/10 318/434 |
| 7,005,822 | B1 * | 2/2006 | O'Gorman | H02P 6/10 318/811 |
| 7,265,509 | B2 * | 9/2007 | Endo | B62D 5/0472 180/443 |
| 7,528,562 | B2 * | 5/2009 | Kahler | B62D 5/046 318/434 |
| 8,766,577 | B2 * | 7/2014 | Suzuki | B62D 5/0496 318/700 |
| 8,863,592 | B2 * | 10/2014 | Mueller | G01L 3/109 73/862.193 |
| 8,878,498 | B2 * | 11/2014 | Herbig | H02J 7/1446 322/28 |
| 9,694,845 | B2 * | 7/2017 | Kikuchi | H02K 1/146 |
| 9,698,711 | B2 * | 7/2017 | Hayashi | H02P 6/10 |
| 9,705,443 | B2 * | 7/2017 | Kikuchi | B62D 5/0403 |
| 2008/0067960 | A1 * | 3/2008 | Maeda | B62D 5/046 180/443 |
| 2011/0169438 | A1 * | 7/2011 | Hasan | H02P 21/22 180/65.285 |
| 2012/0205187 | A1 * | 8/2012 | Izutani | B62D 5/046 180/446 |
| 2014/0288776 | A1 * | 9/2014 | Anderson | F16F 9/466 701/37 |
| 2015/0207439 | A1 * | 7/2015 | Ye | H02P 6/10 318/400.23 |
| 2015/0224845 | A1 * | 8/2015 | Anderson | B60G 17/019 701/37 |
| 2015/0229247 | A1 * | 8/2015 | Nakai | B60L 7/14 318/400.02 |
| 2017/0019052 | A1 * | 1/2017 | Suzuki | B62D 5/04 |
| 2018/0162213 | A1 * | 6/2018 | Colavincenzo | B60L 50/15 |
| 2018/0162355 | A1 * | 6/2018 | Colavincenzo | B60L 50/30 |
| 2018/0162369 | A1 * | 6/2018 | Colavincenzo | B60L 15/2054 |
| 2018/0162371 | A1 * | 6/2018 | Colavincenzo | B60K 6/387 |
| 2018/0162372 | A1 * | 6/2018 | Colavincenzo | B60L 58/20 |
| 2018/0162373 | A1 * | 6/2018 | Colavincenzo | B60L 15/2054 |
| 2018/0162374 | A1 * | 6/2018 | Colavincenzo | B60K 6/448 |
| 2018/0162375 | A1 * | 6/2018 | Colavincenzo | B60L 50/30 |
| 2018/0162376 | A1 * | 6/2018 | Colavincenzo | B60L 3/12 |
| 2018/0162377 | A1 * | 6/2018 | Colavincenzo | B60K 6/26 |
| 2018/0162382 | A1 * | 6/2018 | Colavincenzo | B60K 6/442 |
| 2019/0001805 | A1 * | 1/2019 | Colavincenzo | B60W 20/15 |
| 2019/0351895 | A1 * | 11/2019 | Ben-Ari | B60K 6/26 |
| 2020/0177113 | A1 * | 6/2020 | Suzuki | B62D 5/046 |
| 2023/0078403 | A1 * | 3/2023 | Liu | H02P 21/18 318/400.02 |

FOREIGN PATENT DOCUMENTS

| | | | | |
|---|---|---|---|---|
| CN | 1741368 | A | | 3/2006 |
| CN | 101295953 | A | | 10/2008 |
| CN | 102407879 | A | | 4/2012 |
| CN | 105984492 | A | | 10/2016 |
| CN | 112236935 | A * | 1/2021 | .......... B62D 5/0403 |
| DE | 103 25 855 | A1 | | 12/2003 |
| DE | 10 2011 004 384 | A1 | | 8/2012 |
| DE | 102018127508 | A1 * | 5/2019 | .......... B62D 5/0421 |
| DE | 102019107686 | A1 * | 9/2019 | ............ B62D 5/046 |
| DE | 112019006641 | T5 * | 9/2021 | .......... B62D 5/0409 |
| DE | 102021125685 | A1 * | 4/2022 | .......... B62D 5/0463 |
| EP | 1638200 | A2 * | 3/2006 | ................ H02P 6/10 |
| EP | 1 780 095 | A1 | | 5/2007 |
| EP | 2366603 | A1 * | 9/2011 | ............ B62D 5/046 |
| FR | 2 525 203 | A1 | | 10/1983 |
| FR | 2 825 203 | A1 | | 11/2002 |
| JP | 2008030675 | A * | 2/2008 | ................ B62D 5/046 |
| KR | 20080007999 | A * | 1/2008 | ................ H02P 6/10 |
| WO | WO-0120343 | A1 * | 3/2001 | ................ B62D 5/046 |
| WO | WO-0220293 | A2 * | 3/2002 | ............ B62D 5/046 |
| WO | WO-2004010562 | A1 * | 1/2004 | ............ B62D 5/0403 |
| WO | WO-2004049554 | A1 * | 6/2004 | ............ B62D 5/046 |
| WO | WO-2005081397 | A1 * | 9/2005 | ............. H02P 21/06 |
| WO | WO-2016180469 | A1 * | 11/2016 | ............ B62D 5/046 |
| WO | WO-2017086310 | A1 * | 5/2017 | ............. H02M 1/08 |
| WO | WO-2017158680 | A1 * | 9/2017 | ............ B62D 5/0475 |
| WO | WO-2019216050 | A1 * | 11/2019 | ............ B62D 5/046 |

* cited by examiner

METHOD FOR OPERATING A STEERING SYSTEM HAVING A COMPENSATION DEVICE FOR REDUCING A TORQUE RIPPLE OF A THREE-PHASE MACHINE

This application is a 35 U.S.C. § 371 National Stage Application of PCT/EP2018/085210, filed on Dec. 17, 2018, which claims the benefit of priority to Serial No. DE 10 2018 200 995.3, filed on Jan. 23, 2018 in Germany, the disclosures of which are incorporated herein by reference in their entirety.

BACKGROUND

The disclosure is based on a method for operating a steering system.

In addition, the disclosure relates to a steering system.

Three-phase machines usually have a certain torque ripple, which can be very different depending on the design and control. An increased torque ripple can have a particularly negative effect on a revolution rate control and a working process and can lead to undesirable acoustic noise emissions, so that minimal torque ripple is desirable, in particular also due to increased customer requirements.

For this reason, different methods for compensating and/or reducing a torque ripple of an electrical three-phase machine are known from the prior art.

For example, DE 10 2011004384 A1 discloses a steering system with a synchronous motor, with a control circuit for controlling the synchronous motor and with a compensation device for reducing the torque ripple of the synchronous motor, wherein a control signal of the control circuit is delivered to the compensation device for the generation of a compensation signal and the compensation signal is generated using a previously determined compensation parameter, in particular an amplitude and a phase. In this case, the compensation parameter is essentially determined depending on a motor revolution rate and a setpoint torque of the synchronous motor.

However, such a method shows weaknesses when a supply voltage of the control electronics and/or of the synchronous motor changes during operation, for example due to an increased load on a vehicle electrical system. In addition, synchronous motors are often used, the torque ripple of which changes with a pre-commutation angle of the synchronous motor. However, such a change in torque ripple cannot be compensated by the compensation device and thus also leads to poor compensation of the torque ripple. Moreover, there are certain driving states, such as highway driving, in which the influence of torque ripple on acoustic noise emission is negligible, while in other driving states, such as parking processes, the influence of torque ripple on acoustic noise emission is significant.

The object of the disclosure is in particular to provide a method for operating a steering system as well as a steering system with improved properties relating to a compensating effect. The object is achieved by the characteristic features of the disclosure, while advantageous embodiments and developments of the disclosure can be obtained from the detailed embodiments.

SUMMARY

The disclosure is based on a method for the operation of a steering system, in particular in a vehicle, wherein the steering system has at least one electrical three-phase machine, at least one control circuit for actuation and advantageously for the field-oriented control of the electrical three-phase machine and at least one compensation device operatively connected to the control circuit for reducing a torque ripple of the electrical three-phase machine, wherein at least one compensation parameter of the compensation device is determined, in particular in at least one step of the method.

According to one aspect of the disclosure, it is proposed that in the determination of the at least one compensation parameter at least one operating parameter correlated with a pre-commutation angle of the electrical three-phase machine and/or with a supply voltage of the electrical three-phase machine is taken into account. This design, in particular, allows an improved compensation effect and a torque ripple of the electrical three-phase machine, in particular due to systematic errors, to be particularly efficiently reduced and/or compensated. In particular, torque ripple of the $6^{th}$ electrical order and/or of the $24^{th}$ mechanical order in the case of an electrical three-phase machine with a pole pair number of 4 to be compensated. In addition, advantageously a dependence of the torque ripple on a supply voltage and/or a pre-commutation angle can be taken into account.

A "steering system" shall be understood in this context to mean in particular at least a part, in particular a subassembly, of a vehicle and preferably of a motor vehicle. In particular, the steering system is provided at least to influence a direction of travel of the vehicle. In addition, the steering system comprises in particular at least one computing unit, which is provided to carry out the method for the operation of the steering system. Moreover, the steering system and in particular the control circuit may comprise other additional components and/or assemblies, such as, for example, at least one control electronics for controlling the electrical three-phase machine, at least one control unit for field-oriented control of the electrical three-phase machine and/or at least one sensor unit assigned to the electrical three-phase machine for detecting at least one sensor characteristic variable correlated with the electrical three-phase machine, such as for example a revolution rate, a torque, a rotor position and/or a stator current of the electric three-phase machine. The electrical three-phase machine is advantageously designed as a synchronous machine and particularly preferably as a permanently excited synchronous machine. Particularly advantageously, the electrical three-phase machine is part of an electric auxiliary power steering and/or servo steering system and in particular is provided for generating electrical steering assistance. Alternatively or additionally, the electrical three-phase machine is part of an electrical steering assistance system and/or external power steering and in particular for the generation and/or provision of an additional steering angle and/or a variable transmission ratio. "Provided" shall be understood to mean specially programmed, designed and/or equipped. Where an object is provided for a certain function, it shall be understood in particular to mean that the object performs and/or carries out this particular function in at least one application state and/or operating state.

Furthermore, a "compensation device" shall be understood to mean in particular an electrical and/or electronic device, in particular electrically connected to the control circuit and/or integrated into the control circuit, which is provided for generating a compensation signal using at least one compensation parameter for the reduction of the torque ripple of the electrical three-phase machine. The compensating device is advantageously provided for providing the compensation signal as an output signal and in particular to supply it directly and/or preferably indirectly to the control electronics for control of the electrical three-phase machine. Particularly preferably, the compensation device is supplied with at least one control signal of the control circuit, in particular a controller output signal of the control unit. The compensation signal can then be delivered to the control electronics and/or a calculation unit of the control circuit for calculation with the control signal and/or a further controller output signal of the control unit. Moreover, the at least one compensation parameter is in particular an internal parameter of the compensation device and thus in particular different from an input signal and/or an output signal of the compensating device. Preferably, the at least one compensation parameter comprises an amplitude and/or a phase of a voltage space vector of the electrical three-phase machine. Particularly preferably in the present case, at least two, in particular internal compensation parameters of the compensating device are determined, advantageously depending on the operating parameter, wherein a first compensation parameter is an amplitude of the voltage space vector of the electrical three-phase machine and a second compensation parameter is a phase of the voltage space vector of the electrical three-phase machine.

Furthermore, a "computing unit" shall be understood in particular to mean an electronic unit having an information input, information processing and an information output. Advantageously, the computing unit further has at least one processor, at least one memory, at least one input and/or output means, at least one operating program, at least one control routine, at least one regulating routine and/or at least one calculation routine. In particular, the computing unit is at least provided to determine at least one, in particular internal compensation parameter of the compensating device and advantageously to take into account at least one operating parameter correlated with a pre-commutation angle of the electrical three-phase machine and/or with a supply voltage of the electrical three-phase machine when determining the at least one compensation parameter and advantageously the at least two compensation parameters. Advantageously, the computing unit is also integrated into a control unit of the steering system.

Furthermore, it is proposed that at least one stator current of the electrical three-phase machine, advantageously detected by means of the sensor unit, is used for the determination of the operating parameter. In this way, the operating parameter can be advantageously easily detected.

The operating parameter could, in particular, correspond to the pre-commutation angle of the electrical three-phase machine, a pole wheel angle of the electrical three-phase machine, the supply voltage of the electrical three-phase machine and/or a vehicle electrical system voltage. Advantageously, however, it is proposed that the control circuit has at least one control unit for the field-oriented control of the electrical three-phase machine, in particular the above-mentioned control unit, and the operating parameter corresponds to a ratio of a longitudinal current and a transverse current of the electric three-phase machine. In this way, in particular, a calculation algorithm can be simplified, since advantageously a dependency between the pre-commutation angle, the supply voltage, the longitudinal current and the transverse current can be used to determine the compensation parameter.

Moreover, it is proposed that in the determination of the at least one compensation parameter at least one further operating parameter correlated with a revolution rate of the electrical three-phase machine and/or with a setpoint torque of the electrical three-phase machine is taken into account. Advantageously, the further operating parameter can be measured by means of the sensor unit. Particularly advantageously, it is proposed that in the determination of the compensation parameter at least one first further operating parameter correlated with the revolution rate of the electrical three-phase machine and at least one second further operating parameter correlated with the setpoint torque of the electrical three-phase machine will be taken into account. Preferably, at least two further operating parameters are therefore used, wherein particularly advantageously a first further operating parameter is the revolution rate of the electrical three-phase machine and the second further operating parameters is the setpoint torque of the electrical three-phase machine. Furthermore, it is conceivable, during determination of the compensation parameter, to take into account additional operating parameters, vehicle characteristics and/or environmental characteristics, which for example may be correlated with a driving condition, electrical operation, coasting operation, a system condition of the vehicle and/or a temperature. In this way in particular a particularly advantageous compensation of the torque ripple of the electric three-phase current machine can be achieved.

If the compensation parameter is determined in at least two consecutive steps of the method, wherein in a first step of the method an intermediate parameter is determined by using the further operating parameter, and wherein in a second step of the method subsequent to the first step of the method, the compensation parameter is determined using the intermediate parameter and the operating parameter, already existing calculation algorithms can advantageously be used. In addition, advantageously existing and/or provided steering systems can also be extended. Advantageously, the intermediate parameter results from a characteristic field as a function of the further operation parameter, in particular a 2D-characteristic field and/or advantageously a 3D-characteristic field, which advantageously can be deposited in the memory of the computing unit.

The compensation parameter may in particular result from a further characteristic field, in particular a further 2D characteristic field and/or a further 3D characteristic field, as a function of the intermediate parameter and the operating parameter. However, it is proposed that the compensation parameter is determined using a linear equation. The linear equation has in particular the form y=m·x+t, where the variable y represents the compensation parameter, the variable x represents the operating parameter and the variable t represents the intermediate parameter, while the variable m represents a predetermined and/or applied value, which describes an operating voltage-dependent and/or pre-commutation-dependent characteristic of the electrical three-phase machine and/or the control electronics. In this way, in particular, a calculation algorithm for determining the compensation parameter can be further simplified.

According to a further aspect of the disclosure, which in particular can be realized on its own or advantageously in addition to the aforementioned aspects of the disclosure, and can preferably be combined with at least some, advantageously a large part and particularly preferably all of the above mentioned aspects, a method for the operation of a steering system, in particular in a vehicle, is proposed, wherein the steering system has at least one electrical three-phase machine, at least one control circuit for actuation and advantageously for field-oriented control of the electrical three-phase machine and at least one compensating device operatively connected to the control circuit for the reduction of a torque ripple of the electrical three-phase machine, wherein, in particular in at least one step of the method, at least one compensation parameter of the compensating device is determined, wherein the compensation device, in at least one operating state, generates a compensation signal for the reduction of the torque ripple of the electric three-phase machine using at least one compensation parameter, and wherein at least one vehicle characteristic correlated with a driving condition, such as when cornering, driving on a motorway, urban driving and/or a parking process is taken into account in the generation of the compensation signal. In this way, in particular the advantages already mentioned above can be achieved. In particular, a corresponding embodiment can improve a compensating effect and a torque ripple of the electric rotary current machine, in particular due to systematic error, can be particularly efficiently reduced and/or compensated. In particular, torque ripple of the 6th electrical order and/or of the $24^{th}$ mechanical order in the case of an electrical three-phase machine with a pole pair number of 4 can be compensated. In addition, advantageously the dependency of the torque ripple on a driving condition can be taken into account.

According to a particularly preferred embodiment of the disclosure, it is further proposed that the vehicle characteristic is a vehicle speed and the compensation signal is generated only if the vehicle speed is below a predetermined speed limit. The speed limit value is advantageously not greater than 20 km/h, preferably not greater than 15 km/h and especially preferably not greater than 10 km/h. In this way, in particular a particularly efficient compensation routine can be provided, wherein advantageously compensation of the torque ripple is carried out only in a vehicle speed range in which the influence of torque ripple on acoustic noise emission is significant. In principle, however, the compensation signal can also be generated for speeds above 20 km/h.

The method for operating the steering system and/or the steering system shall not be limited to the application and embodiment described above. In particular, the method for operating the steering system and/or the steering system may have a different number of individual elements, components and units from a number specified herein for the fulfillment of a functionality described herein.

BRIEF DESCRIPTION OF THE DRAWINGS

Further advantages arise from the following description of the drawings. In the drawings an embodiment of the disclosure is shown. The drawings and the description contain numerous features in combination. The person skilled in the art will also consider the features individually and summarize them into meaningful further combinations.

In the figures.

DETAILED DESCRIPTION

Figure 1A:
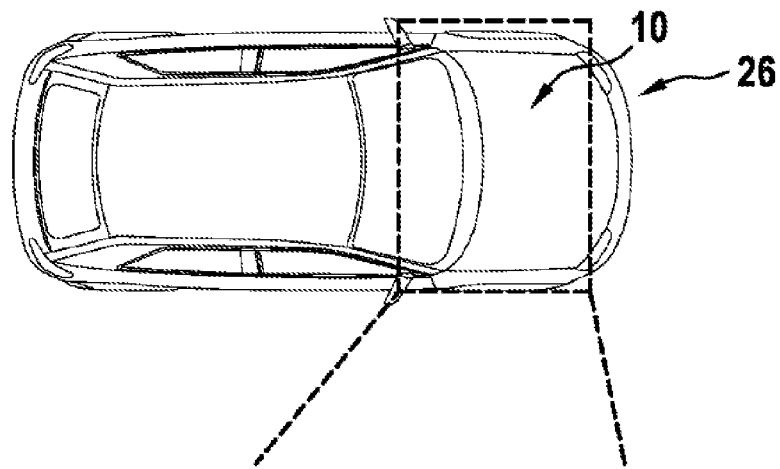
FIGS. 1a-b show an exemplary vehicle with a steering system in a simplified representation.
Figure 1B:
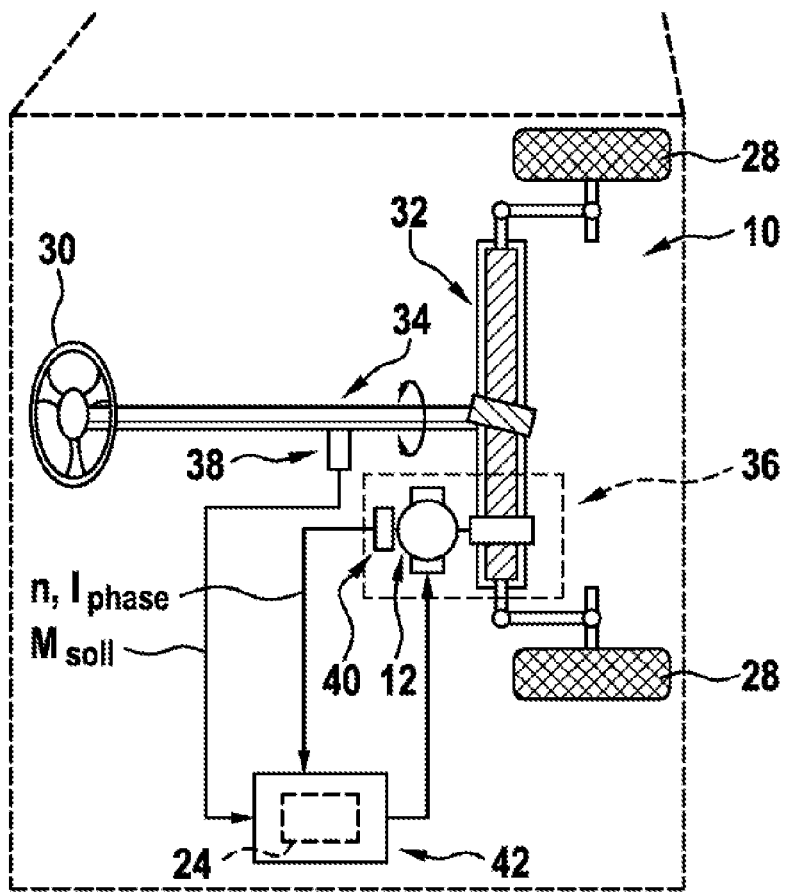

FIGS. 1a and 1b show an exemplary vehicle 26 with several vehicle wheels 28 and with a steering system 10 in a simplified representation. The steering system 10 has an operative connection to the vehicle wheels 28 and is provided to influence a direction of travel of the vehicle 26. Furthermore, the steering system 10 is designed as an electrically assisted steering system and in the present case has in particular an electrical power steering system. In principle, however, it is also conceivable to design a steering system with an electrical assistance steering system and/or an external power steering system. In addition, a steering system could in principle also be designed as a control-by-wire steering system.

The steering system 10 comprises a steering handle 30, in this case by way of example in the form of a steering wheel, for applying a manual steering torque, a steering gear 32, which is designed by way of example as a rack-and-pinion steering gear, which is provided to convert a steering demand at the steering handle 30 into a steering movement of the vehicle wheels 28, and a steering column 34 for in particular mechanical connection of the steering handle 30 to the steering gear 32.

Furthermore, the steering system 10 comprises an electrically implemented assistance unit 36 for the generation and/or provision of electrical steering assistance. The assistance unit 36 is provided to introduce an assistance torque into the steering gear 32 and to assist the manual steering torque, in particular applied by the driver. Alternatively, a steering handle could also be designed as a steering lever and/or a steering ball or the like. Also, a steering system could in principle have no steering handle, for example in a purely autonomous driving vehicle. In addition, a steering column could only temporarily connect a steering handle to a steering gear, such as in a vehicle with an autonomous driving mode and/or a steer-by-wire steering system with a mechanical fallback level. In the latter case, the steering system may also have no assistance unit and instead may comprises at least one steering actuator and/or wheel actuator.

Furthermore, the steering system 10 comprises at least one electrical three-phase machine 12. The electrical three-phase machine 12 is designed as an actuator unit. In the present case, the electrical three-phase machine 12 is designed as an in particular permanently excited synchronous motor. The electrical three-phase machine 12 is part of the electrical power steering and in particular is provided for the generation of the electric steering assistance. However, an electrical three-phase machine could also perform a function that differs from a steering assistance function. In this context, the electrical three-phase machine could, for example, be part of an electrical power steering system and/or external force steering system and in particular can be provided for the generation and/or provision of an additional steering angle and/or a variable transmission ratio. In addition, an electrical three-phase machine, especially in a steer-by-wire steering system, could also be part of a steering actuator and/or a wheel actuator.

Moreover, the steering system 10 comprises at least one sensor unit 38, 40, in the present case in particular a first sensor unit 38 and a second sensor unit 40. The first sensor unit 38 is assigned to the steering column 34. In the present case, the first sensor unit 38 is in the form of a torque sensor and is provided for the acquisition of steering angle information from the steering handle 30. The steering angle information corresponds to a setpoint torque $M_{soll}$ for the electrical three-phase machine 12 and is a measure of the manual steering torque, in particular applied by the driver. The second sensor unit 40 is assigned to the electrical three-phase machine 12. The second sensor unit 40 is designed to capture at least one sensor variable correlated with the electrical three-phase machine 12, in the present case in particular at least one revolution rate n and a stator current $I_{phase}$ of the electrical three-phase machine 12. In principle, however, a first sensor unit could also be in the form of an angular difference sensor or the like. In addition, a second sensor unit could also be implemented as a rotor position sensor or the like.

Moreover, the steering system 10 has a control unit 42. The control unit 42 has an operative connection to the sensor units 38, 40 and to the electrical three-phase machine 12. The control unit 42 is provided to receive the steering angle information and the sensor parameter and to control the electrical three-phase machine 12 accordingly depending on the steering angle information and the sensor parameter.

For this purpose, the control unit 42 comprises a computing unit 24. The computing unit 24 comprises at least one processor (not shown), for example in the form of a microprocessor, and at least one memory (not shown). In addition, the computing unit 24 comprises at least one operating program stored in memory with at least one calculation routine, at least one control routine and at least one regulating routine.

Moreover, the steering system 10 may comprise other components and/or assemblies, such as at least one detection unit (not shown) for the detection of vehicle characteristics and/or environmental characteristics, such as a temperature.

Figure 2:
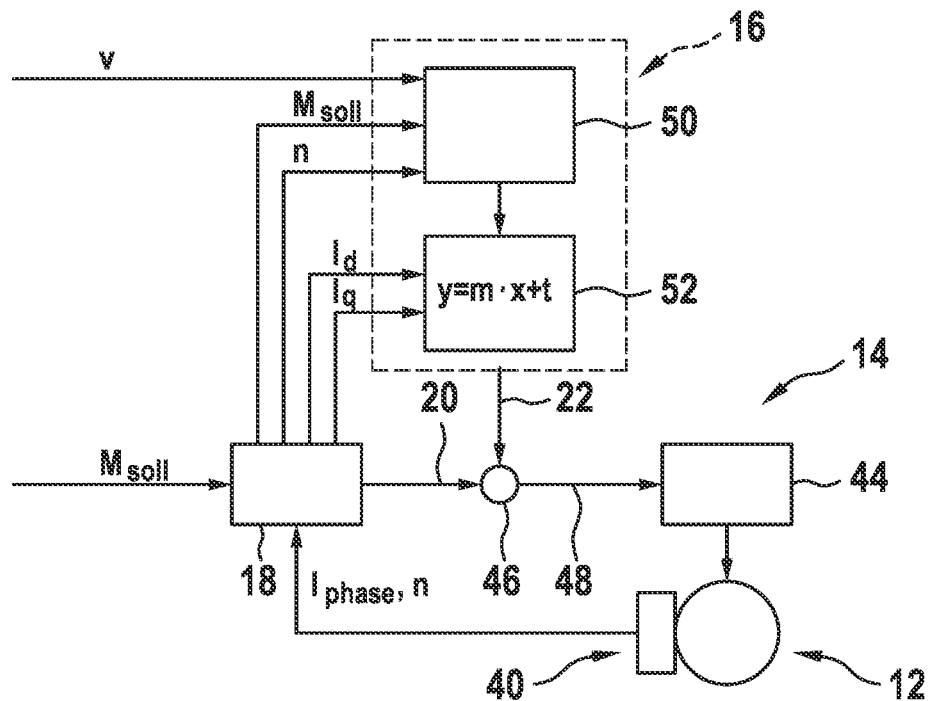
FIG. 2 shows a block diagram representation of an electrical three-phase machine, a control circuit, and a compensation device of the steering system.

FIG. 2 shows a simplified schematic design of the control unit 42 and in particular a simplified basic block diagram of a control circuit for the electrical three-phase machine 12.

For actuating the electrical three-phase machine 12, the steering system 10 has a control circuit 14. The control circuit 14 is provided to process and/or to provide at least one control signal.

For this purpose, the control circuit 14 comprises a control unit 18. The control unit 18 is electrically connected to the first sensor unit 38 and the second sensor unit 40. The control unit 18 is provided for field-oriented control of the electrical three-phase machine 12. In this case, the control unit 18 is provided to receive the steering angle information and the sensor parameter. In the present case, the control unit 18 is at least provided to receive the setpoint torque $M_{soll}$ and the revolution rate n. In addition, the control unit 18 is provided to pass on the setpoint torque $M_{soll}$ and the revolution rate n. Furthermore, the control unit 18 is at least provided to receive the stator current $I_{phase}$ and to divide it into a longitudinal current $I_d$ and a transverse current $I_q$.

Furthermore, the control circuit 14 comprises control electronics 44 for controlling the electrical three-phase machine 12. The control electronics 44 are connected after the control unit 18 in terms of control. The control electronics 44 are further electrically connected to the electrical three-phase machine 12. In the present case, the control electronics 44 comprise a PWM unit (not shown) for the generation of a pulse-width modulated control signal as well as power electronics (not shown), in particular in the form of an inverter unit and/or an end stage. In principle, however, it is also conceivable to integrate a control unit into the control electronics and/or to dispense with a PWM unit.

Usually, electrical three-phase machines have a certain torque ripple. However, this torque ripple can have a negative effect on control and lead to undesirable acoustic noise emissions.

As a minimal torque ripple is desirable, in particular due to increased customer requirements, the steering system 10 comprises a compensation device 16 for reducing the torque ripple of the electrical three-phase machine 12. The compensation device 16 has an operative connection to the control circuit 14. The compensating device 16 is provided to generate a compensation signal 22 in at least one operating state to reduce the torque ripple of the electrical three-phase machine 12 and in particular to supply it to a calculation unit 46 of the control unit 14 for calculating with a controller output signal 20 of the control unit 18. The calculation unit 46 then forwards a compensated control signal 48, in the present case in particular a summation signal of the compensation signal 22 and the controller output signal 20, to the control electronics 44 for actuation of the electrical three-phase machine 12.

The compensation signal 22 is generated using at least one previously determined compensation parameter y. The compensation parameter y corresponds to an internal parameter of the compensation device 16 and comprises an amplitude and/or a phase of a voltage space vector of the electrical three-phase machine 12. In order to achieve a particularly high compensation effect, advantageously two compensation parameters y are determined, wherein a first compensation parameter is an amplitude of the voltage space vector of the electrical three-phase machine 12 and a second compensation parameter is a phase of the voltage space vector of the electrical three-phase machine 12.

When determining the at least one compensation parameter y, at least a first operating parameter correlated with the revolution rate n of the electrical three-phase machine 12 and a second operating parameter correlated with the setpoint torque $M_{soll}$ of the electrical three-phase machine 12 are taken into account. In the present case, the first operating parameter is the revolution rate n, while the second operating parameter is the setpoint torque $M_{soll}$. The revolution rate n and the setpoint torque $M_{soll}$ are supplied to the compensation device 16 by the control unit 18, in the present case in particular to a first calculation routine 50 of the compensation device 16. In principle, however, it is also conceivable to only take into account a first operating parameter correlated with a revolution rate of an electrical three-phase machine or a second operating parameter correlated with a setpoint torque of an electrical three-phase machine. In addition, the compensating device could be directly supplied with a first operating parameter and/or a second operating parameter by a sensor unit.

Furthermore, in determining the at least one compensation parameter y, at least one third operating parameter x correlated with a pre-commutation angle of the electric three-phase current machine 12 and/or with a supply voltage of the electrical three-phase machine 12 correlated is taken into account. The pre-commutation angle is the angle between the current vector and the q-axis of the coordinate system based on the rotor field of the electrical three-phase machine 12. The supply voltage of the electrical three-phase machine 12 is in the present case a vehicle electrical system voltage of the vehicle 26.

The third operating parameter x corresponds to a ratio between the longitudinal current $I_d$ and the transverse current $I_q$ of the electrical three-phase machine 12 and is determined using the stator current $I_{phase}$ of the electrical three-phase machine 12. The longitudinal current $I_d$ and the transverse current $I_q$ are supplied to the compensation device 16 by the control unit 18, in the present case in particular to a second calculation routine 52 of the compensation device 16. In principle, however, a third operating parameter could also be directly supplied to the compensation device by a sensor unit.

Figure 3:
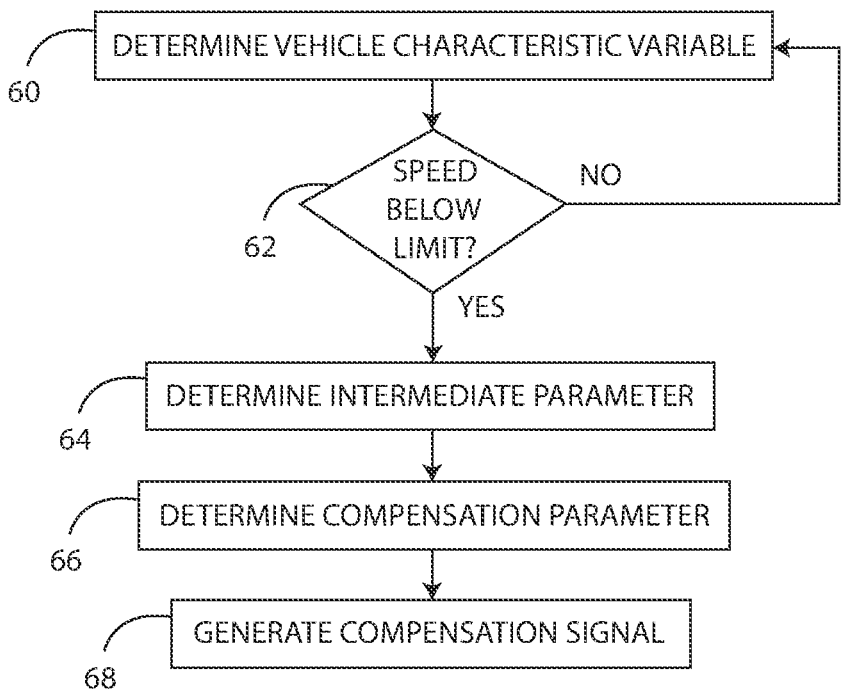
FIG. 3 shows an exemplary flowchart of a method for the operation of the steering system.

The determination of the compensation parameter y is also carried out in at least two consecutive steps 64, 66 of the method (cf. also FIG. 3). In a first step 64 of the method, an intermediate parameter t is determined by the first calculation routine 50 of the compensating device 16 by using the first operating parameter and the second operating parameter, in the present case in particular the revolution rate n and the setpoint torque $M_{soll}$. The intermediate parameter t is read from a characteristic field, in particular a 3D characteristic field, as a function of the revolution rate n and the setpoint torque $M_{soll}$. In a second step 66 of the method following on from the first step 64 of the method, the compensation parameter y is determined by the second calculation routine 52 of the compensation device 16 using the intermediate parameter t and the third operating parameter x. The compensation parameter y is determined using a linear equation. The linear equation has the form y=m·x+t, where y represents the compensation parameter, x represents the third operating parameter and t represents the intermediate parameter, while the variable m is a predetermined and/or applied value, which describes an operating voltage-dependent and/or pre-commutation-dependent characteristic of the electrical three-phase machine 12 and/or the control electronics 44. Due to this embodiment, in particular a compensation effect can be improved and a torque ripple of the electrical three-phase machine 12 can be reduced and/or compensated particularly efficiently.

Furthermore, in the generation of the compensation signal 22, at least one vehicle characteristic variable v correlated with a driving condition is taken into account. In the present case, the vehicle characteristic variable v is a vehicle speed, wherein the compensation signal 22 is generated only if the vehicle speed falls below a predetermined speed limit value, which in the present case is 10 km/h. In this way, in particular, a particularly efficient compensation routine can be provided, wherein compensation of the torque ripple is only carried out in a vehicle speed range in which the influence of torque ripple on acoustic noise emissions is significant.

FIG. 3 shows an exemplary flow diagram of a method for operating the steering system 10, wherein the computing unit 24 is provided to carry out the method and in particular has a computer program with appropriate program code means for this purpose.

In a step 60 of the method, the vehicle characteristic variable v is determined and it is decided on the basis of the vehicle characteristic variable v whether the compensation signal 22 will be generated or not for reduction of the torque ripple of the electrical three-phase machine 12.

In the present case, a step 62 of the method examines whether the vehicle speed is below the predeterminable speed limit. If the vehicle speed falls below the predeterminable speed limit, step 64 of the method follows. If the vehicle speed is not below the predeterminable speed limit, then step 60 of the method follows again.

In steps 64 and 66 of the method, the at least one compensation parameter y is determined. In step 64 of the method, the intermediate parameter t is determined using the second operating parameter and the third operating parameter, while in step 66 of the method the compensation parameter y is determined using the intermediate parameter t and the third operating indicator x.

Then in step 68 of the method, the compensation signal 22 for reducing the torque ripple of the electrical three-phase machine 12 is generated using the at least one compensation parameter y.

The exemplary flow diagram in FIG. 3 is intended in particular to describe a method for the operation of the steering system 10 only by way of example. In particular, individual steps of the method and/or a sequence of steps of the method may vary. For example, a determination of the vehicle characteristic variable v and/or the determination of the compensation parameter y in two consecutive steps of the method 64, 66 could be dispensed with.

The invention claimed is:

1. A method for operating a steering system, the steering system having at least one electrical three-phase machine, at least one control circuit configured to actuate the at least one electrical three-phase machine, and at least one compensation device operatively connected to the at least one control circuit, the method comprising:
   determining at least one compensation parameter of the at least one compensation device based on a correlation of at least one first operating parameter with (i) a pre-commutation angle of the at least one electrical three-phase machine and (ii) a supply voltage of the at least one electrical three-phase machine; and
   operating the at least one electrical three-phase machine based on the determined at least one compensation parameter to reduce a torque ripple of the at least one electrical three-phase machine,
   wherein the pre-commutation angle is an angle between a current vector and a q-axis of a coordinate system based on a rotor field of the at least one electrical three-phase machine.

2. The method as claimed in claim 1, the determining the at least one compensation parameter further comprising:
   identifying the at least one first operating parameter using at least one stator current of the at least one electrical three-phase machine.

3. The method as claimed in claim 2, wherein:
   the at least one control circuit has at least one control unit configured to control the at least one electrical three-phase machine in a field-oriented manner; and
   the at least one first operating parameter corresponds to a ratio between a longitudinal current and a transverse current of the at least one electrical three-phase machine.

4. The method as claimed in claim 1, the determining the at least one compensation parameter further comprising:
   determining the at least one compensation parameter based on a correlation of at least one second operating parameter with (i) a revolution rate of the at least one electrical three-phase machine and (ii) a target torque of the at least one electrical three-phase machine.

5. The method as claimed in claim 4, the determining the at least one compensation parameter further comprising:
   determining an intermediate parameter using the at least one second operating parameter; and
   determining the at least one compensation parameter using the intermediate parameter and the at least one first operating parameter.

6. The method as claimed in claim 1, the determining the at least one compensation parameter further comprising:
   determining the at least one compensation parameter using a linear equation in the form y=mx+t,
   wherein an output of the linear equation is y, which is the at least one compensation parameter,
   wherein m is based on the pre-commutation angle,
   wherein x is a second operating parameter corresponding to a ratio between a longitudinal current and a transverse current of the at least one electrical three-phase machine, and
   wherein t is a third operating parameter based on a revolution rate of the at least one electrical three-phase machine and a target torque of the at least one electrical three-phase machine.

7. The method as claimed in claim 1 further comprising:
   generating, with the at least one compensating device, a compensation signal configured to reduce the torque ripple of the at least one electrical three-phase machine in at least one operating state using the at least one compensation parameter, the compensation signal being generated based on a correlation of at least one vehicle characteristic with a driving condition.

8. The method as claimed in claim 7, wherein the at least one vehicle characteristic is a vehicle speed and the compensation signal is generated only if the vehicle speed is less than a predetermined speed limit.

9. The method as claimed in claim 8, wherein the predetermined speed limit is 20 km/h.

10. A steering system comprising:
at least one electrical three-phase machine;
at least one control circuit configured to actuate the at least one electrical three-phase machine;
at least one compensation device operatively connected to the at least one control circuit and configured to generate a compensation signal configured to reduce a torque ripple of the at least one electrical three-phase machine, the compensation signal provided to the at least one control circuit; and
a computing unit configured to determine at least one compensation parameter of the at least one compensation device based on a correlation of at least one first operating parameter with at least one of (i) a pre-commutation angle of the at least one electrical three-phase machine and (ii) a supply voltage of the at least one electrical three-phase machine,
wherein the at least one compensation parameter is used to generate the compensation signal, and
wherein the compensation signal is generated only when a vehicle speed is less than a predetermined speed limit.

11. The steering system as claimed in claim 10, wherein the predetermined speed limit is 20 km/h.

12. A vehicle comprising:
a steering system having:
at least one electrical three-phase machine;
at least one control circuit configured to actuate the at least one electrical three-phase machine;
at least one compensation device operatively connected to the at least one control circuit and configured to reduce a torque ripple of the at least one electrical three-phase machine based on a compensation signal; and
a computing unit configured to determine at least one compensation parameter of the at least one compensation device based on a correlation of at least one first operating parameter with (i) a pre-commutation angle of the at least one electrical three-phase machine and (ii) a supply voltage of the at least one electrical three-phase machine,
wherein the at least one compensation parameter is used to generate the compensation signal, and
wherein the pre-commutation angle is an angle between a current vector and a q-axis of a coordinate system based on a rotor field of the at least one electrical three-phase machine.

* * * * *